(12) United States Patent  (10) Patent No.: US 7,997,863 B2
Christopherson  (45) Date of Patent: Aug. 16, 2011

(54) WIND TURBINE

(76) Inventor: Myron L. Christopherson, Colfax, WI (US)

( * ) Notice: Subject to any disclaimer, the term of this patent is extended or adjusted under 35 U.S.C. 154(b) by 29 days.

(21) Appl. No.: 12/556,171

(22) Filed: Sep. 9, 2009

(65) Prior Publication Data

US 2010/0129218 A1 May 27, 2010

Related U.S. Application Data

(60) Provisional application No. 61/095,394, filed on Sep. 9, 2008.

(51) Int. Cl.
*F03D 7/06* (2006.01)
*F03D 3/02* (2006.01)

(52) U.S. Cl. .......... 416/40; 416/198 R; 416/155; 416/98
(58) Field of Classification Search .............. 416/198 R, 416/155, 98, 244 R, 40
See application file for complete search history.

(56) References Cited

U.S. PATENT DOCUMENTS

| 1,035,377 | A | * | 8/1912 | Mendez | 416/113 |
| 1,516,668 | A | * | 11/1924 | Burch | 416/118 |
| 1,540,583 | A | * | 6/1925 | Williams et al. | 416/113 |
| 2,441,635 | A | * | 5/1948 | Iverson | 416/98 |

* cited by examiner

*Primary Examiner* — Edward Look
*Assistant Examiner* — Jesse Prager
(74) *Attorney, Agent, or Firm* — Glance Law Group

(57) ABSTRACT

Described herein is an improved wind turbine with a dynamic blade configuration.

13 Claims, 7 Drawing Sheets

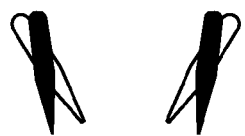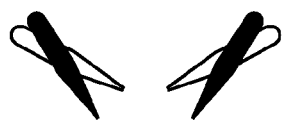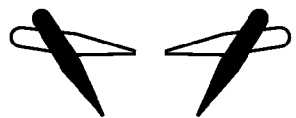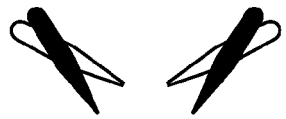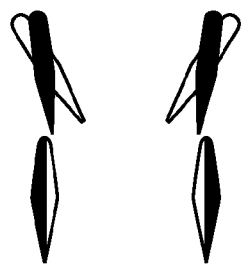
FIG. 8

WIND TURBINE

CROSS-REFERENCE TO RELATED PATENT APPLICATIONS

This present application claims priority to previously filed U.S. Provisional Patent Application No. 61/095,394, filed Sep. 9, 2008 and incorporated by reference in its entirety.

TECHNICAL FIELD

The present disclosure relates to wind turbines. More particularly, it relates to a wind turbine with a dynamic blade configuration.

BACKGROUND

Wind turbines can be used to harness kinetic wind energy and convert the energy to useable electricity. Most wind turbines used today include a vertical boom that supports a horizontal shaft which has two or more blades extending therefrom. Often the horizontal shaft is attached to the boom so that it can pivot about the axis of the boom and align itself into the wind. Also, in some wind turbine configurations the pitch of the blades can be adjusted to account for wind velocity.

SUMMARY

The present disclosure provides a wind turbine that works well in both low and high wind speed conditions. In some embodiments the wind turbine includes relatively large twin blades that are configured to spin at relatively low revolutions per minute (RPM), thus providing increased thrust and torque to the drive shaft. In some embodiments the wind turbine includes a drive shaft geared to a generator via a relatively large gear ratio, thereby providing a more uniform rate of power production as compared to comparably sized prior art wind turbines. The present disclosure provides a turbine that is configured to operate with the drive shaft being generally perpendicular to the wind direction. In some embodiments the blades are configured to rotate about their own axes as the blades rotate around the drive shaft.

BRIEF DESCRIPTION OF THE FIGURES

FIG. 8 is a schematic view illustrating the changing angles of the blades as the blades move, according to the wind turbine illustrated in FIG. 7.

DETAILED DESCRIPTION

Figure 1:
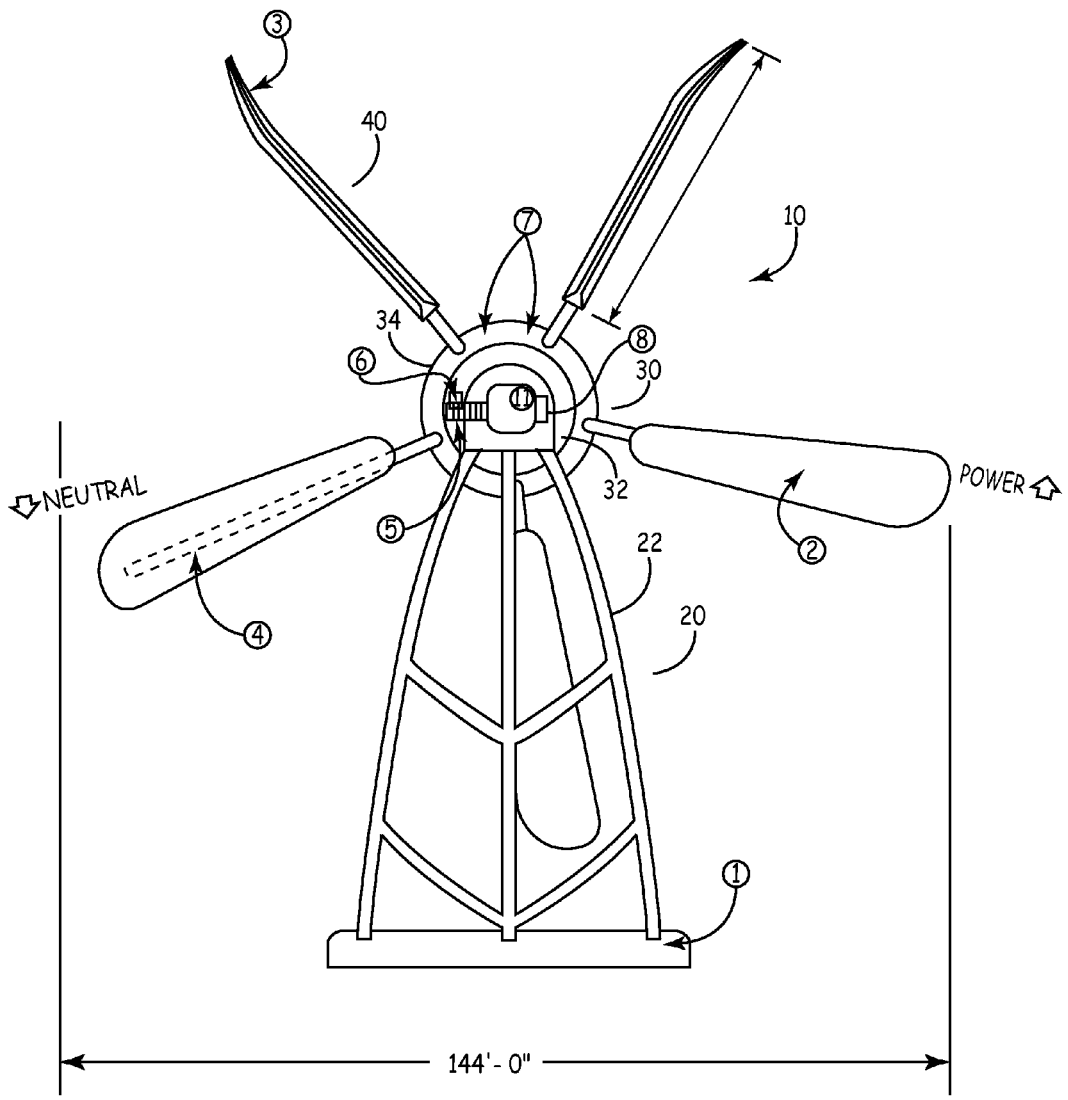
FIG. 1 is a side view of an embodiment of a wind turbine according to the principles of the present disclosure.
Figure 2:
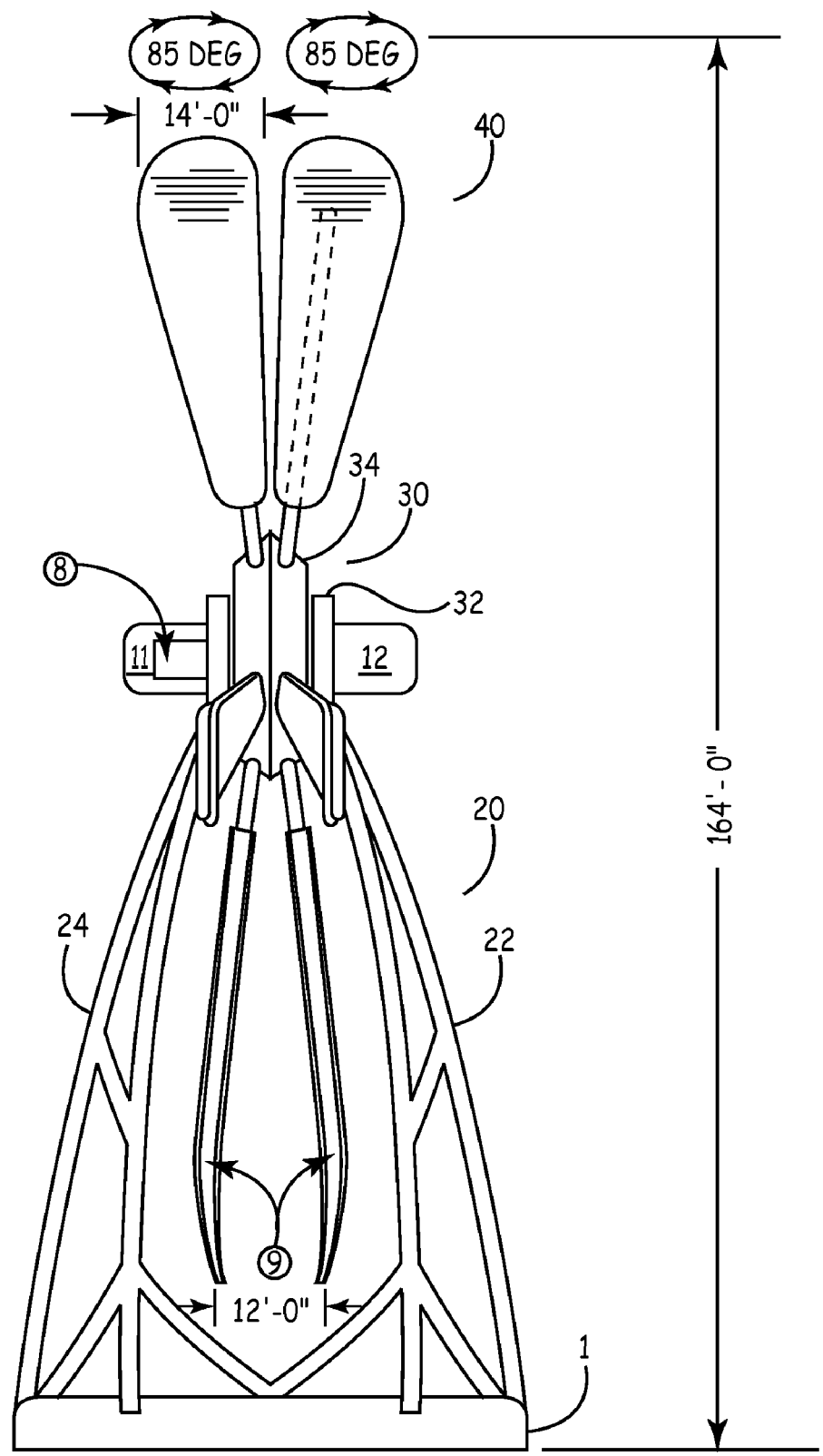
FIG. 2 is a front view of the wind turbine according to FIG. 1.

Referring to FIGS. 1-2, the wind turbine 10 includes a support structure 20 that supports a drive unit 30 and a plurality of blades 40. In one depicted embodiment the support structure 20 includes a base 1, a first leg 22, and a second leg 24. The base 1 can be a mono-rail type base. In some embodiments the base rides in a track(s) and/or tires and is configured to rotate 360 degrees about a vertical axis. In some embodiments the base can be mounted on rubber tires so as to reduce vibration and shock.

In one depicted embodiment the first leg 22 and second leg 24 each have one end connected to the base 1 and another end supporting the drive unit 30. In one depicted embodiment, the legs 22, 24 are shown separated by a distance that is sufficient to allow the blades 40 to travel therebetween (see FIG. 2). In a depicted embodiment each of the legs includes several interlaced support members (e.g., three generally vertical bar members connected by four angled supports) and are configured to allow air to travel freely by.

The drive unit 30 includes a first portion 32 that is supported by the support structure 20, and a second portion 34 that rotates relative to the support structure and is supported by the first portion 32. The second portion 34 supports the blades 40 and houses the transmission system 7 which drives the components that convert kinetic energy to electric energy. In a depicted embodiment the transmission comprises a worm gear for transferring rotational energy.

In a depicted embodiment the support structure 20 also supports a maintenance platform 5, a maintenance access 6 (e.g., door), and an auxiliary power unit 8. The maintenance platform 5 and maintenance access 6 provide convenient access into the drive unit 30, as it is expected that from time to time the components housed within the drive unit 30 may require maintenance or repair. In a depicted embodiment the auxiliary power unit 8 provides auxiliary power when necessary to move the turbine blades into optimal position. The auxiliary power unit can, for example, be configured to drive two wheels (not shown) that are arranged to adjust the orientation of the turbine to maintain ideal alignment with the wind direction. The auxiliary power can be used to quickly lockdown the blade in a neutral position in an emergency situation (e.g., a windstorm, system component failure, etc.).

One depicted embodiment of the wind turbine 10 includes five sets of twin blades 40. In one embodiment the blades 40 are evenly spaced on the second portion 34 of the drive unit 30. The blades 40 rotate about their own axes as they rotate together about the drive shaft. Each blade is supported on a stabilizer member 4 that extends substantially through the body portion of the blade and connects the blade to the second portion 34 of the drive unit 30. The stabilizer members 4 in some embodiments of the present disclosure are configured to allow the blade to flex during operation. In one depicted embodiment, the ends of the blade include a power assist curve 9.

The blades 40 in one depicted embodiment are configured to rotate in a counterclockwise direction with the wind moving from right to left. The blade is more perpendicular to the wind when the blade is at the top of the rotation, and more parallel to the wind when the blade is at the bottom of the rotation. At the midpoint of the rotation the blade is in transition and is in a neutral phase. Blades 40 in the neutral phase are spaced apart wider at the tips to cut down on turbulence. In one depicted embodiment the blades 40 are to be balanced horizontally across the stabilizer, with the trailing portion of the blade to have from 15% to 20% greater area to receive more power. The portion of the blade on one side of the stabilizer can be considered the leading portion of the blade, and the portion of the blade on the other side of the stabilizer can be considered the trailing portion of the blade. The blades 40 rotate about their axes from the power phase into the neutral phase and back into the power phase. Referring to FIG. 2, in a depicted embodiment the left blades rotate in a clockwise direction into the power phase and the right blades rotate in a counterclockwise direction into the power phase. In a depicted embodiment the blades 40 are controlled by a worm gear type transmission for greater accuracy and holding power. Variable speed electric motors can be used to drive the rotation and increase power phase by 15-20 percent.

It should be appreciated that many blade shapes and arrangements are possible. In a depicted embodiment the leading edges of the blades are over the stabilizer and thicker at the base. It is believed that this tapered profile can result in less resistance for rotation in the neutral phase.

In some embodiments the wind turbine is very large. For example, it is believed that the unit may weigh 110 tons and produce 4½ times more power than turbines with blades in a standard prop configuration. In some embodiments the diameter of rotation is about 144 feet, the overall height is about 164 feet, and the distance between the distal blade tips in the neutral position is about 12 feet. It should be appreciated that the design is scalable into many other configurations as well.

Figure 3:
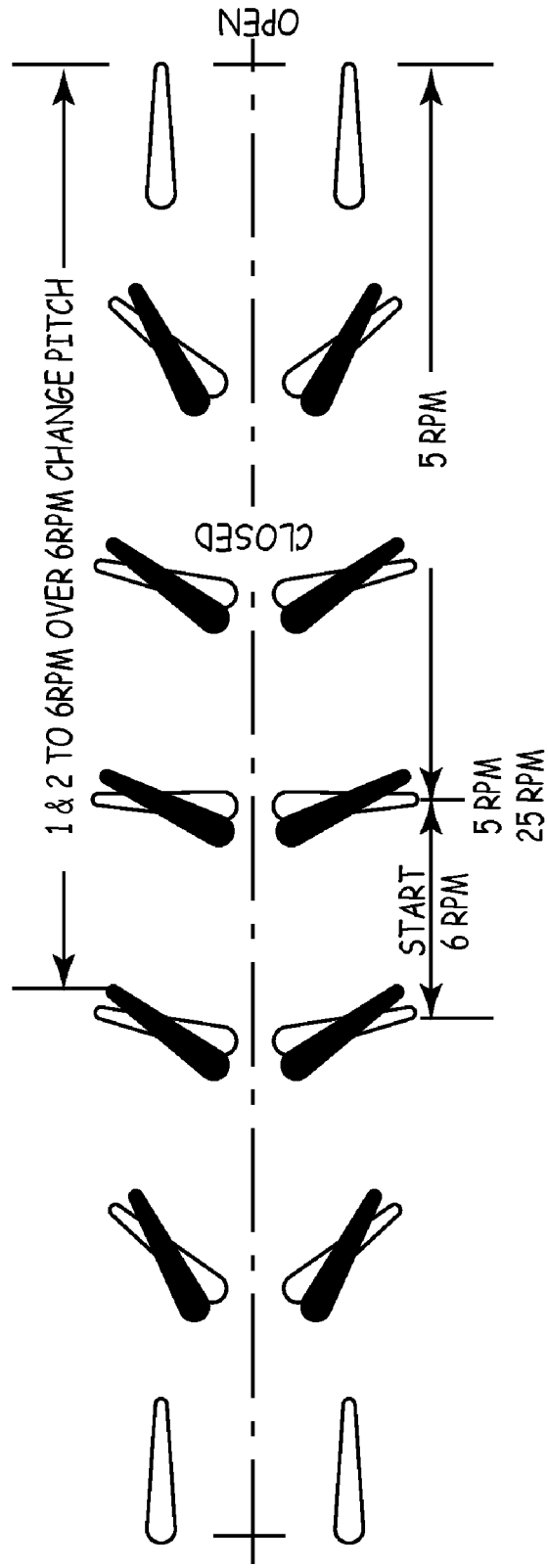
FIG. 3 is a schematic view illustrating the changing angle of the blades as the blades move.

A depicted embodiment includes two generators 11 and 12. With generator 11 on line, the start of the power cycle is with the twin stabilizers at 10 degrees below the forward horizontal position. The end of the power cycle is 20 degrees below the rear horizontal position. The transmission begins the rotation of the twin blades 40 at a forward neutral point of least resistance with the trailing, wider portion of the blades rotating outward, left and right, creating the pitch called for by the computer (not shown). FIG. 3 is a schematic view illustrating the changing angle of the blades as the blades move.

The proper pitch can be determined in part based on the RPM of the drive shaft and the rate of rotation of the blades and the time lapse between 10 degrees below forward horizon and 105 degrees of travel, for example. Slow RPM will generally call for lowering the blade pitch; greater RPM will generally call for increasing the blade pitch. This phase can be repeated for each succeeding set of twin blades. In some embodiments, 105 degrees is considered one half cycle, and at 105 degrees a control system starts the blades to return to the neutral phase. It is believed that 25 MPH winds will result in rotational speeds of about 5 RPM.

According to a depicted embodiment, it is believed that the most power is produced at a relatively slower RPM, which closes the blades 40 at the top of the power cycle. It is believed that the turbine according to the present disclosure of a particular height can reach a wind force comparable to prior art turbines that are about 65% taller. It is also believed that cyclic stresses can be decreased substantially or even almost eliminated. Cyclic stresses are known to result in blade fatigue in traditional wind turbines, thereby shortening the useful life of such turbines.

With wind speed increasing, the pitch is automatically increased due to the time lapse between start-up to the 105 degree center point. With a pre-set RPM in the control system, generator 12 goes on line, increasing the drag and reducing the RPM, thereby reducing the pitch and increasing the power and torque to the drive shaft. The control system can serve as a governor, as in a gas engine. As wind decreases in velocity, all programmed phases will be reintroduced, reversing the entry steps. It is believed that from start-up time of the power cycle until about 105 degrees will take about 3½ seconds, and the time to return the blade to the neutral phase will be about 3½ seconds.

When wind velocity becomes too strong, a third phase puts all twin blades 40 into neutral lockdown. It is believed that the main bearings of this turbine may be replaced without the use of cranes. Therefore, it is expected that maintenance of wind turbines according to the present disclosure will be less costly and time consuming.

Figure 4:
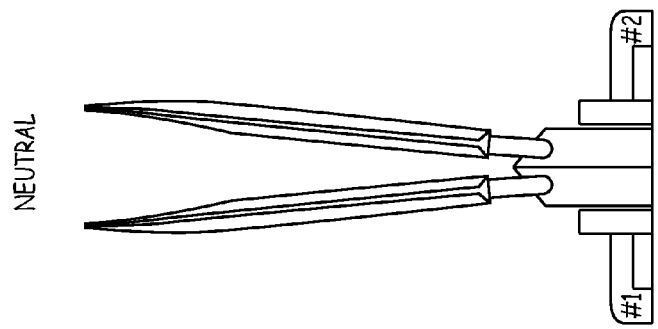
FIGS. 4-6 illustrate various blade pitch configurations of the wind turbine of FIG. 1.
Figure 5:
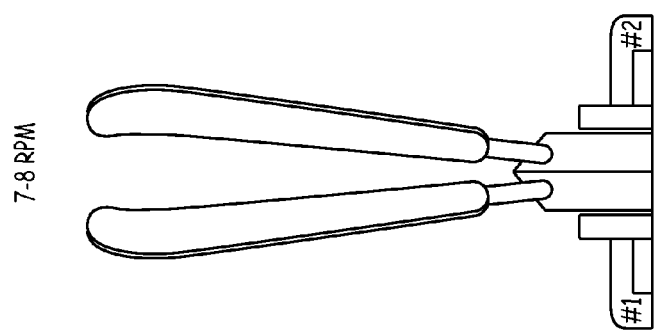
Figure 6:
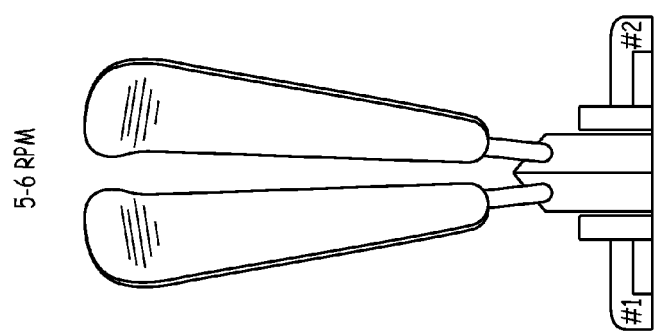

It should be appreciated that the pitch of the blade during the power phase can be set in accordance with the wind speed or the measured rotational speed of the turbine. The faster rotational speeds can be correlated with higher blade pitches. For example, the pitch of the blades 40 shown in FIG. 2 might correspond to the turbine rotating at between 3-4 RPM, the pitch shown in FIG. 4 might correspond to the turbine rotating at between 5-6 RPM, and the pitch shown in FIG. 5 might correspond to the turbine rotating at between 7-8 RPM. The neutral pitch is shown in FIG. 6.

Figure 7:
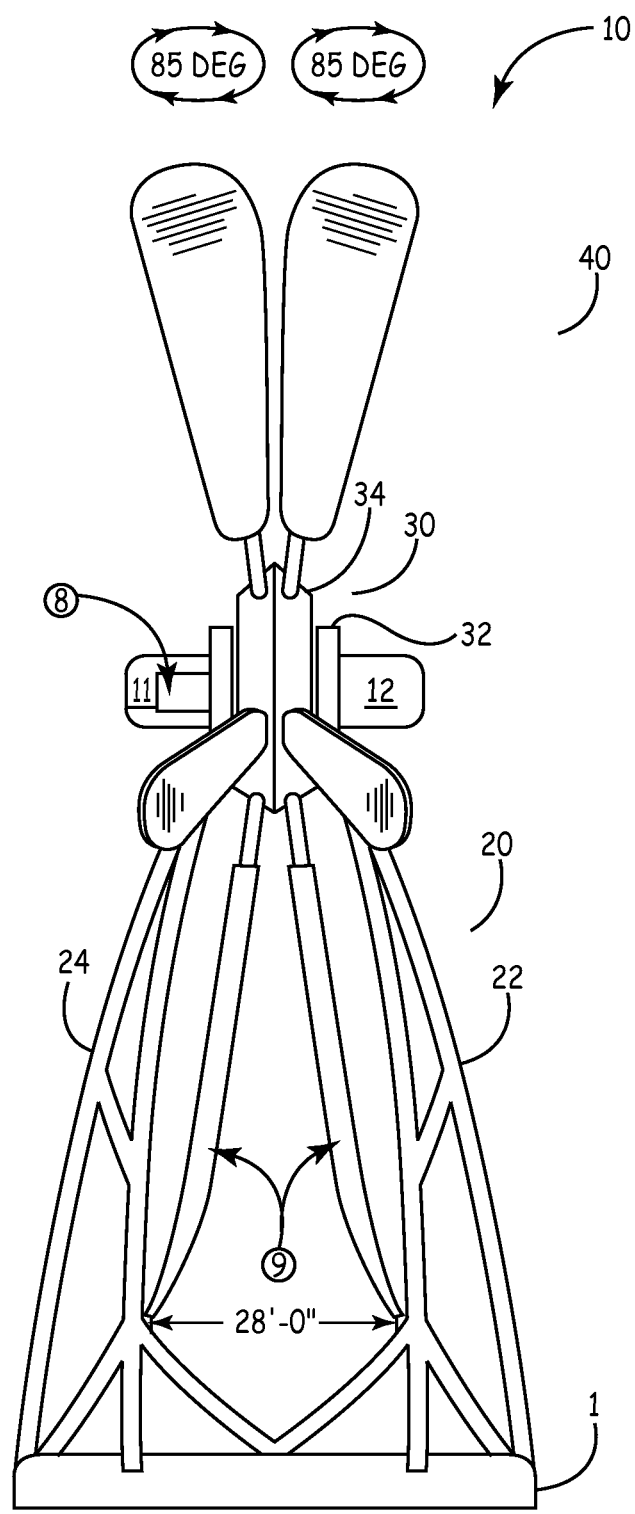
FIG. 7 illustrates an embodiment of a wind turbine according to this disclosure.
Figure 7A:
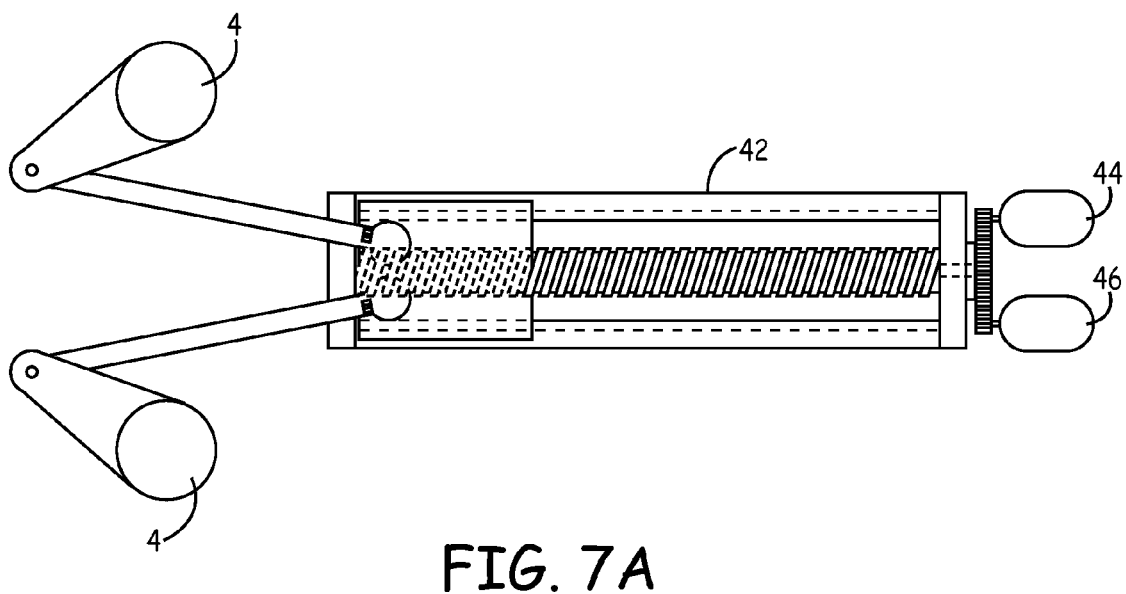

Another embodiment is depicted in FIG. 7. This turbine 10 is designed to take advantage of both low and high wind speeds. By presenting a larger surface area, the turbine 10 will produce a greater thrust and torque applied to the turbine's drive shaft, thus enabling the use of a higher gear ratio to drive the two generators 11 and 12 at a higher RPM. As depicted in FIG. 7A, to produce greater thrust, the stabilizer 4 is operably attached to a screw-type transmission 42 used along with two-phase electric motors 44, 46, easing the start-up and enabling a quicker presentation of larger blades.

The offset blades rotating on the stabilizers will ease the turning of the blades into the closed or power phase and help in placing the blades into the neutral phase at the rear of the turbine. The power phase is determined to be started at 10 degrees below the forward horizon, ending after 105 degrees of travel, where the return to the neutral position begins. The time required to reach the 105 degrees will correspond to the time to reach the neutral phase, for a total travel of 210 degrees. With the uniform speed of the transmission in the power phase and the return to the neutral phase, the transmission and the speed of the turbine will become the turbine governor and will automatically set the blade pitch. FIG. 8 is a schematic view illustrating the changing angles of the blades as the blades move, according to the wind turbine illustrated in FIG. 7.

One generator is to be used with low wind speeds, allowing the blades to reach the closed position of 85 degrees. As winds increase, the blades' pitch is also increased. As the turbine speed reaches a pre-set RPM, the second generator is put online, slowing the turbine and lowering the pitch, bringing on more thrust and torque to the drive shaft. All of this creates a more uniform production of electric power. Lowering of wind speeds will reverse the previous phases.

Compared to equal-height turbines, this turbine reaches and captures winds at 65 percent higher altitude, and eliminates almost all of the cyclic stresses. The main turbine drive shaft bearings may be replaced by the use of two 50-ton, built-in hydraulic jacks, rather than using cranes, making maintenance less costly. This unit is believed to be more quiet running and attractive than existing turbines.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A wind turbine, comprising:
a boom having a first support and a second support;
a drive unit mounted on said boom;
a shaft having an axis of rotation and an angle of rotation, said shaft mounted on said first support and on said second support so as to be able to rotate through a number of revolutions per minute (RPM);
an elongated first turbine blade extending from said shaft to a first tip, said first turbine blade having a first body member for receiving wind energy and a first stabilizer member connected to said first body member and to said drive unit, said first stabilizer member for adjusting a pitch of said first body member relative to wind; and an elongated second turbine blade extending from said shaft to a second tip, said second turbine blade adjacent to but separated from said first turbine blade such that wind can pass between said first turbine blade and said second turbine blade, said second turbine blade including a second body member for receiving wind energy and a second stabilizer member connected to said second body member and to said drive unit, said second stabilizer member for adjusting a pitch of said second body member relative to wind;

wherein said drive unit connects to and drives said first stabilizer member and said second stabilizer member, and wherein driving said first stabilizer member changes the pitch of said first body member and driving said second stabilizer member changes the pitch of said second body member.

2. A wind turbine according to claim 1, wherein said drive unit drives said first stabilizer member and said second stabilizer member in accord with wind velocity.

3. A wind turbine according to claim 1, wherein said drive unit drives said first stabilizer member and said second stabilizer member in accord with said angle of rotation.

4. A wind turbine according to claim 3, wherein said drive unit drives said first stabilizer member and said second stabilizer member in accord with wind velocity.

5. A wind turbine according to claim 1, wherein said drive unit drives said first stabilizer member and said second stabilizer member in accord with said RPM.

6. A wind turbine according to claim 1, wherein said first body member and said second body member are spaced further apart between said first tip and said second tip than at said shaft.

7. A wind turbine according to claim 1, wherein said first body member is tapered.

8. A wind turbine according to claim 1, wherein said first turbine blade and said second turbine blade rotate about their own axes as said drive shaft rotates.

9. A wind turbine, comprising:
a boom having a base, a first leg extending from said base and having a first support; and
a second leg extending from said base and having a second support;
a drive unit mounted on said boom, said drive unit including an auxiliary power drive unit;
a shaft having an axis of rotation and an angle of rotation, said shaft mounted on said first support and on said second support so as to be enabled to revolve a number of times per minute (RPM);
an elongated first turbine blade extending from said shaft to form a first tip, said first turbine blade having a first body member for receiving wind energy and a first stabilizer member connected to said first body member and to said drive unit, said first stabilizer member for adjusting a pitch of said first body member relative to wind; and
an elongated second turbine blade extending from said shaft to form a second tip, said second turbine blade adjacent to and separated from said first turbine blade such that wind can pass between said first turbine blade and said second turbine blade, said second turbine blade including a second body member for receiving wind energy and a second stabilizer member connected to said second body member and to said drive unit, said second stabilizer member for adjusting a pitch of said second body member relative to the wind;
wherein said drive unit adjusts the pitch of said first turbine blade and the pitch of said second turbine blade; and
wherein said first and second turbine blades pass between said first leg and second leg if said shaft rotates on said axis.

10. A wind turbine according to claim 9, wherein said first turbine blade and said second turbine blade rotate about their own axes as said drive shaft rotates.

11. A wind turbine according to claim 9, further including a maintenance platform attached to said boom.

12. A wind turbine according to claim 11, wherein said maintenance platform includes a maintenance access door for obtaining access to said drive unit.

13. A wind turbine according to claim 9, wherein said drive unit adjusts said first pitch of said first turbine blade and said second pitch of said second turbine blade in accord with said RPM.

* * * * *